(12) United States Patent
Wallman

(10) Patent No.: US 7,917,941 B2
(45) Date of Patent: Mar. 29, 2011

(54) SYSTEM AND METHOD FOR PROVIDING PHYSICAL WEB SECURITY USING IP ADDRESSES

(75) Inventor: Bruce Wallman, Princeton, NJ (US)

(73) Assignee: International Business Machines Corporation, Armonk, NY (US)

(*) Notice: Subject to any disclaimer, the term of this patent is extended or adjusted under 35 U.S.C. 154(b) by 2130 days.

(21) Appl. No.: 10/667,852

(22) Filed: Sep. 22, 2003

(65) Prior Publication Data

US 2005/0066043 A1 Mar. 24, 2005

(51) Int. Cl.
*G06F 7/04* (2006.01)

(52) U.S. Cl. ............ 726/4; 726/3; 726/18; 726/21; 380/247; 380/248; 380/249; 380/250; 711/147; 711/148; 711/149; 711/150; 711/151; 711/152; 711/153; 713/155; 713/156; 713/157; 713/158; 713/159

(58) Field of Classification Search ............ 726/3, 4, 726/18, 21, 26, 28; 709/22; 380/247–250; 711/147–153; 713/155–159
See application file for complete search history.

(56) References Cited

U.S. PATENT DOCUMENTS

| 6,073,178 | A | 6/2000 | Wong et al. |
| 6,087,196 | A | 7/2000 | Sturm et al. |
| 6,442,588 | B1 * | 8/2002 | Clark et al. ............... 709/203 |
| 6,662,228 | B1 * | 12/2003 | Limsico ................... 709/225 |
| 6,725,376 | B1 * | 4/2004 | Sasmazel et al. ........... 726/10 |
| 7,233,997 | B1 * | 6/2007 | Leveridge et al. ......... 709/229 |
| 7,382,787 | B1 * | 6/2008 | Barnes et al. ............. 370/401 |
| 2002/0120868 | A1 * | 8/2002 | Hay ......................... 713/201 |
| 2003/0084343 | A1 * | 5/2003 | Ramachandran et al. .... 713/201 |
| 2003/0097596 | A1 * | 5/2003 | Muratov et al. ............ 713/202 |

FOREIGN PATENT DOCUMENTS

| JP | 2000219720 | 8/2000 |
| JP | 2003019790 | 1/2003 |
| JP | 2003115834 | 4/2003 |
| JP | 2003-524882 | 8/2003 |
| JP | 2005-510836 | 4/2005 |
| WO | 9812689 | 3/1998 |
| WO | WO03026196 A1 | 3/2003 |

* cited by examiner

*Primary Examiner* — Christian LaForgia
*Assistant Examiner* — Roderick Tolentino
(74) *Attorney, Agent, or Firm* — Douglas A. Lashmit; Hoffman Warnick LLC

(57) ABSTRACT

A system and method for providing security for an Internet server. The system comprises: a logical security system for processing login and password data received from a client device during a server session in order to authenticate a user; and a physical security system for processing Internet protocol (IP) address information of the client device in order to authenticate the client device for the duration of the server session.

10 Claims, 3 Drawing Sheets

SYSTEM AND METHOD FOR PROVIDING PHYSICAL WEB SECURITY USING IP ADDRESSES

BACKGROUND OF THE INVENTION

1. Technical Field

The present invention relates generally to computer network security, and relates more specifically to a system and method for providing physical web security using IP addresses.

2. Related Art

Presently, there exist numerous challenges for providing security over the web. One such challenge involves ensuring the identity of a user that is accessing a server. Login and password systems are well known to provide a basic level of security to limit access to a server. In such systems, login and password information is utilized at the beginning of a session to authenticate a user. For subsequent messages sent by the user, login information can be sent to the server in a cookie along with the message, thereby authenticating the user for the entire session.

However, because of the nature of the Internet, is it possible to intercept packets coming across the web and to see exactly what someone has sent from their client device. Accordingly, security information can be intercepted by a third party, which could be used to modify or create a new message that could be passed to the server during the session. The server would thus be fooled into believing that the third party is actually the original user.

One way to address this problem would be to verify that the physical device used at the creation of a session remains the same throughout the session. In this manner, a third party residing at different physical location could be easily distinguished from the original user. Currently, there exist various "encrypted certificate" services on the web that provide processes, such as placing certified cookies on the Internet clients to verify the sending machines. Unfortunately, such processes are costly, can be broken since they depend on logical security only, and create browser setup and usage issues that cause unwanted complexities for users.

Accordingly, a need exists for a security system in which servers can verify the physical address of a client device on the Internet.

SUMMARY OF THE INVENTION

The present invention addresses the above-mentioned problems, as well as others, by providing a system and method for providing logical and physical web security using IP addresses to identify client devices. In a first aspect, the invention provides a system for providing security for an Internet server, comprising: a logical security system for processing login and password data received from a client device during a server session in order to authenticate a user; and a physical security system for processing Internet protocol (IP) address information of the client device in order to authenticate the client device during the server session.

In a second aspect, the invention provides a method of authenticating a user accessing an Internet server, comprising: storing in a memory system a reference Internet protocol (IP) address and associated login data whenever a new server session is initiated on the server from a client device; receiving a message from a requesting user; obtaining login data accompanying the message; obtaining an IP address from a message header in the message; determining if the login data of the requesting user is currently listed in the memory system as an existing session with the server; and if the login data of the requesting user is currently listed, determining if the IP address from the received message matches the reference IP address associated with the login data of the requesting user.

In a third aspect, the invention provides a program product stored on a recordable medium for providing security for an Internet server, the program product comprising: means for processing logical security information received from a client device during a server session in order to authenticate a user; and means for processing Internet protocol (IP) address information of the client device in order to authenticate the client device during the server session.

BRIEF DESCRIPTION OF THE DRAWINGS

These and other features of this invention will be more readily understood from the following detailed description of the various aspects of the invention taken in conjunction with the accompanying drawings in which.

DETAILED DESCRIPTION OF THE INVENTION

Figure 1:
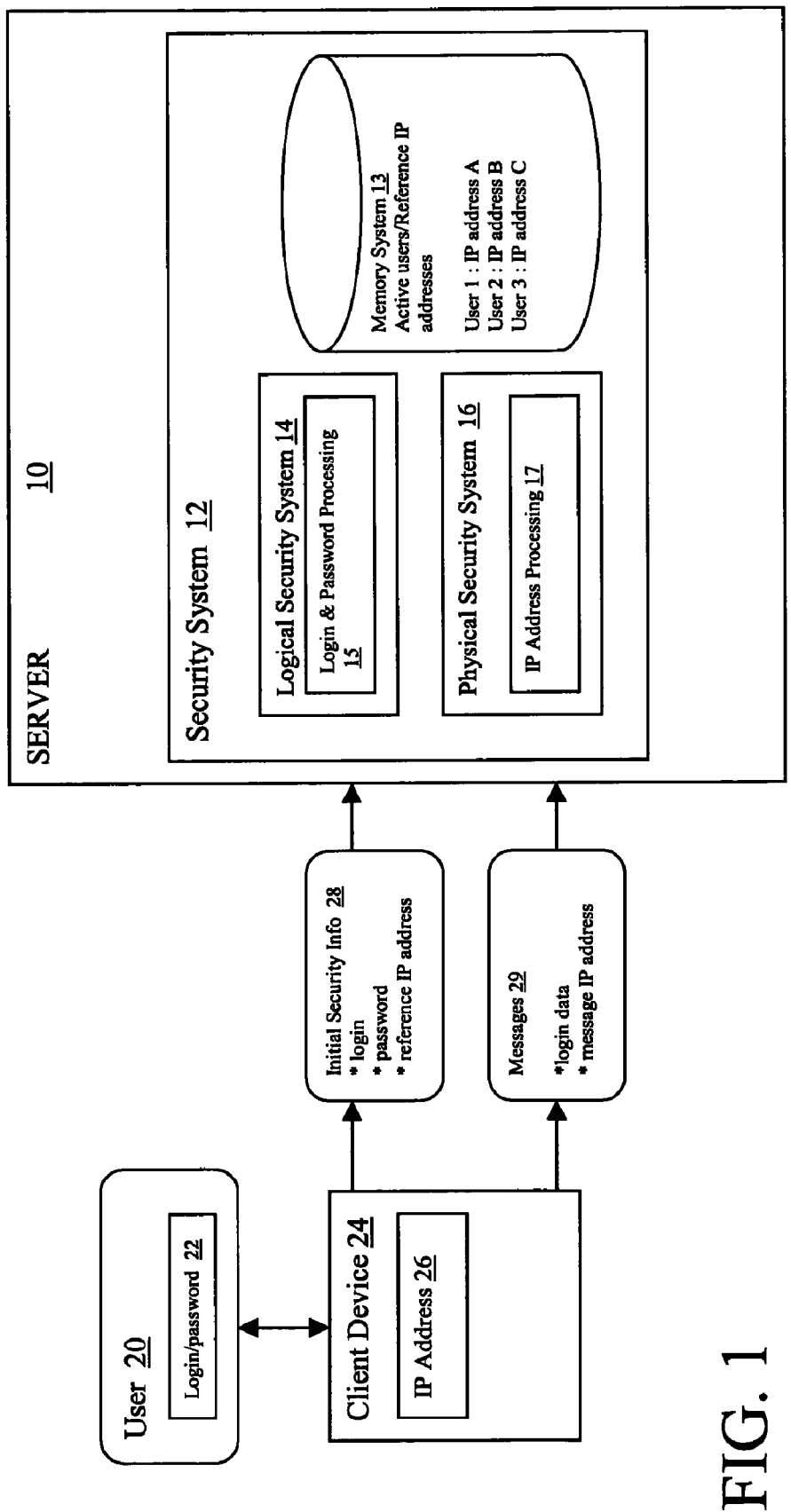
FIG. 1 depicts a server having logical and physical security in accordance with the present invention.

Referring now to the drawings, FIG. 1 depicts an exemplary Internet server 10 having a security system 12 in accordance with the present invention. Security system 12 includes a logical security system 14 having login and password processing 15, and a physical security system 16 having IP address processing 17. In addition, security system 12 includes a memory system 13 that includes a list of logged in users and an associated reference IP address for each logged in user. Memory system 13 may comprise any type of storage mechanism, including a database, system memory, RAM, cache memory, a data object, etc. User 20 interacts with server 10 via client device 24 using, e.g., hypertext transfer protocol (HTTP). Client device 24 could comprise any type of device capable of communicating with server 10 using an IP addressing system. Exemplary client devices 24 may include computer workstations, PDA's, cell phones, appliances, etc. Moreover, it should be understood that the term "user" may refer to both human and machine participation, e.g., it may refer to a smart appliance.

In general, a server session begins on server 10 whenever a user 20 logs in, and ends whenever the user 20 logs out. To successfully log into server 10 from client device 24, user 20 must supply some initial security information 28, which generally comprises login and password information, to logical security system 14. Assuming the login and password information is accepted by logical security system 14, user 20 is initially authenticated, and security system 12 stores the user login data (e.g., their login name) and the associated IP address 26 (i.e., the reference IP address) of the client device 24 in memory system 13. The reference IP address is readily available from the IP message header that is included with all HTTP messages. Thus, memory system 13 lists all logged in users and a reference IP address indicating the client device 24 from where the user's session was initiated.

It should be recognized that while the exemplary embodiments describe initial security information 28 as containing standard login and password data, "login and password data" should be interpreted broadly to include any type of security information that could be utilized to identify and authenticate user 20. Examples could include retinal scan data, voice biometrics, fingerprints, etc.

Once the user is logged in, the user 20 is listed as active and can begin sending messages 29 to the server 10. In addition to the substantive message information being sent, each message 29 sent to server 10 also includes user login data and the IP address of the client device 24 that sent the message 29. The login data, which may for example include the user's log in name, can be included in a cookie that is automatically sent to the server 10 with each message 29. Similar to the case with the initial security information 28, the IP address for each message 29 is automatically included in the message header. Once server 10 receives a message 29, logical security system 14 compares the login data from the message 29 with the list of logged in users in memory system 13 to determine if the sender of the message is logged into an active server session. If the sender is not logged in, then appropriate action is taken, e.g., a login procedure could be initiated for the sender, an error message could be returned, etc.

Assuming the sender of the message is listed as a valid user, then the IP address of the message is compared to the reference IP address associated with the user 20 as listed in memory system 13. If the IP addresses match, then the message 29 is processed. If the IP address in the message 29 does not match the reference IP address for the user, then appropriate action can be taken. For example, the session can be terminated, all sessions involving the user 20 can be terminated, i.e., all instances of the user 20 in the active user list in memory system 13 can be deleted. Thus, any third party that attempts to intervene themselves in an existing server session will be identified by physical security system 16 as fraudulent since their IP address will not match the user's reference IP address. Accordingly, both logical and physical authentication is provided.

Figure 2:
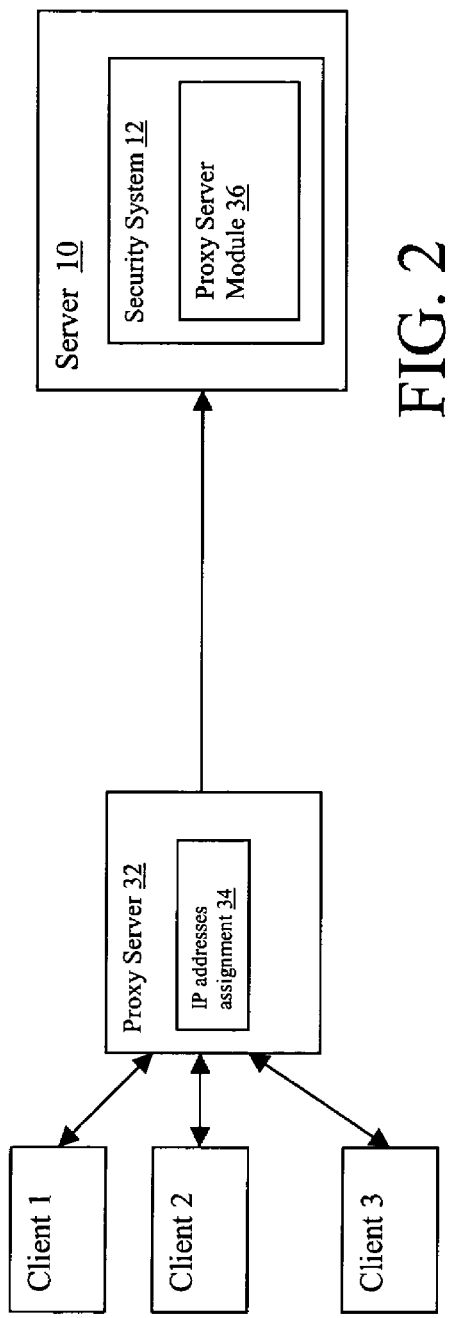
FIG. 2 depicts a security system in a proxy server environment in accordance with the present invention.

Referring now to FIG. 2, an additional embodiment of the invention is described for the case where client devices (e.g., clients 1-3) access server 10 via a proxy server 32. Proxy servers 32 are common in large organizations where a firewall is implemented, etc. Thus, in this case, the client devices do not have permanent IP addresses assigned to them. Instead, proxy server 32 includes an IP address assignment mechanism 34 that assigns new IP addresses each time one of the client devices send a new message.

To address this scenario, security system 10 includes a proxy server module 36 that causes the physical security system 16 (not shown) to only compare relevant portions of the IP addresses. Although the entire IP address can change from message to message in a proxy server 32 environment, the first portion of the address generally remains unchanged. (In most cases, the first 24 characters of the IP addresses generated by a proxy server do not change.) Thus, messages routed through proxy server 32 are assigned an IP address from a "family" of related IP addresses that include a "constant" portion that does not change. Proxy server module 36 compares only the constant portion from new messages with a "like" portion of the reference IP address stored in the memory system 13 in order to provide physical authentication.

Accordingly, while 100 percent effectiveness cannot be provided in the case where a proxy server 32 is involved, the proxy server module 36 still allows heightened physical security at an "organizational" level.

Figure 3:
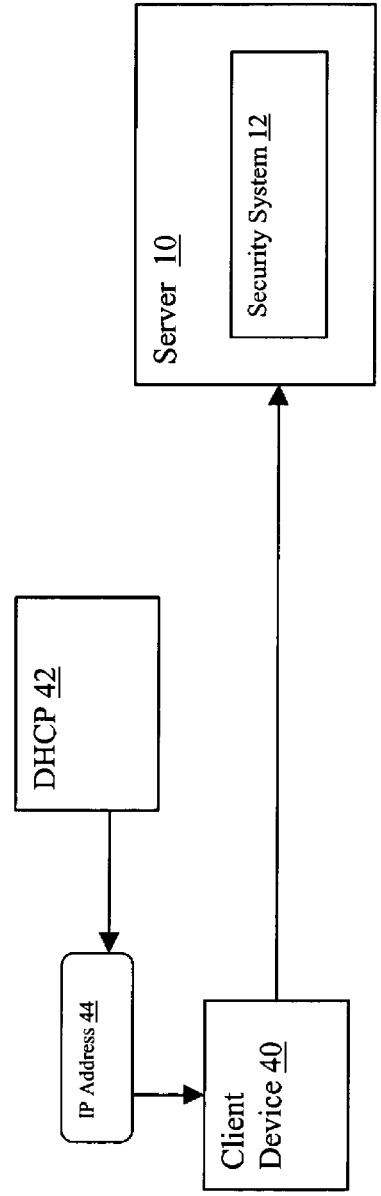
FIG. 3 depicts a security system in a DHCP environment in accordance with the present invention.

An important feature of the present invention is that the security system 12 can operate in a dynamic host configuration protocol (DHCP) environment. FIG. 3 depicts the case where a dynamic host configuration protocol (DHCP) server 42 is utilized. DHCP servers are commonly utilized in large company and cable and telephone modem hook-up environments. In such an environment, the DCHP server 42 provides an IP address to the client device 40 when the client device goes active (i.e., after it is connected to the Internet). Accordingly, as long as client device 40 remains active, then the IP address of client device remains constant, and security system 12 can operate as described with reference to FIGS. 1 and 2. Accordingly, the present invention maintains the same effectiveness in the case where a DCHP server is utilized.

Figure 4:
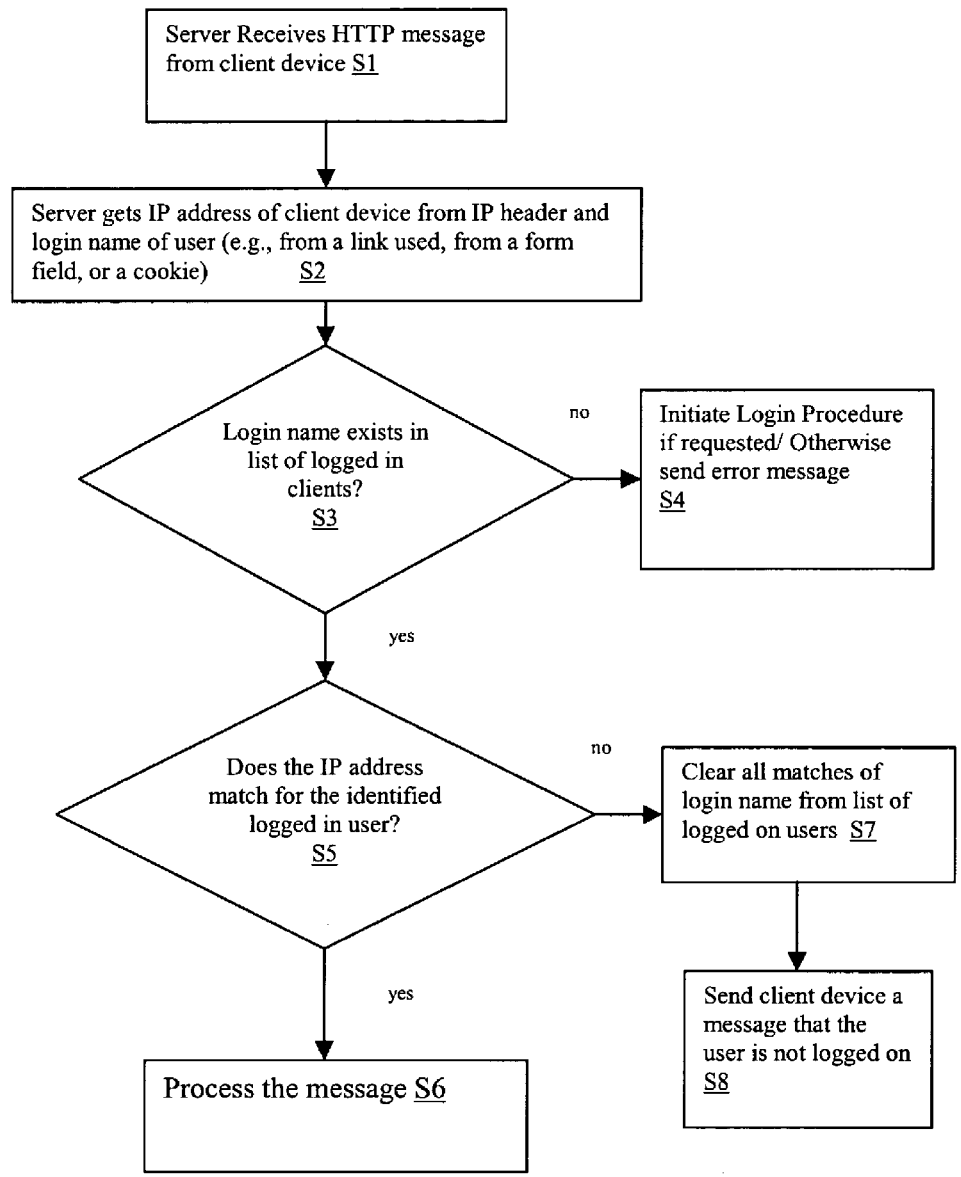
FIG. 4 depicts a flow diagram of a method of providing logical and physical security in an Internet server environment in accordance with the present invention.

FIG. 4 depicts a flow diagram describing an exemplary methodology of the present invention. At step S1, the server receives an HTTP message from a client device. At step S2, the server extracts the IP address of the client device from the IP header, and also extracts the login name of the user (e.g., from the link used, from a form field, from a cookies, etc.). Next, at step S3, the server checks to see if the login name exists in a list of logged in users. In not, a login procedure is initiated if requested at step S4. Otherwise, an error message is sent to the user. If the login name is listed, the server compares the IP address from the message with a reference IP address stored in the list of logged in users with the login name at step S5. If the IP addresses do not match, the server clears all instances of the login name from the list of logged in clients at step S7, and sends the client device a message that the user has been logged out at step S8. If the IP addresses do match, then the server at step S6 processes the message.

It is understood that the systems, functions, mechanisms, methods, and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of the invention has been presented for purposes of illustration and description. They are not intended to be exhaustive or to limit the invention to the precise form disclosed, and obviously many modifications and variations are possible in light of the above teachings. Such modifications and variations that are apparent to a person skilled in the art are intended to be included within the scope of this invention as defined by the accompanying claims.

The invention claimed is:

1. A system for providing security for an Internet server, comprising:
   a logical security system for processing login and password data received from a client device during a server session with the Internet server in order to authenticate a logged in user;
   a physical security system for processing Internet protocol (IP) address information of the client device at the Internet server in order to authenticate the client device for the duration of the server session; and
   a memory system for storing, at the Internet server, a list of each logged in user and a reference IP address collected during a login procedure, wherein the logical security system is configured to access the list to authenticate the logged in user, and wherein the physical security system is configured to separately access the list in order to authenticate the client device;
   wherein the physical security system includes a proxy server module for comparing only an incomplete portion of an IP address obtained from a received message against only a like incomplete portion of the reference IP address for the logged in user;
   wherein the physical security system further performs the following:
      terminates the session for the user if the incomplete portion of the IP address obtained from the received message does not match the like incomplete portion of the reference IP address for the logged in user; and
      deletes all instances of the logged in user from the stored list if the incomplete portion of the IP address obtained from the received message does not match the like incomplete portion of the reference IP address for the logged in user.

2. The system of claim 1, wherein the incomplete portion of the IP address includes the first characters of the IP address.

3. The system of claim 1, wherein the IP address information is received from a proxy server capable of sending a plurality of IP addresses assigned to a plurality of client devices, and wherein the IP address includes the incomplete portion which is constant for each of the plurality of IP addresses.

4. A method of authenticating a user accessing an Internet server, comprising:
   storing in a memory system, at the Internet server, a reference Internet protocol (IP) address and associated login data whenever a new server session is initiated on the Internet server from a client device;
   receiving a message from a requesting user at the Internet server;
   obtaining login data accompanying the message;
   obtaining an IP address from a message header in the message;
   determining if the login data of the requesting user is currently listed in the memory system as an existing session with the Internet server;
   if the login data of the requesting user is currently listed, determining at the Internet server if the IP address from the received message matches the reference IP address associated with the login data of the requesting user, the determining of the IP address including examining only an incomplete portion of the IP address of the requesting user and determining if the incomplete portion matches only a like incomplete portion of the reference IP address;
   terminating all server sessions listed in the memory system having the login data of the requesting user if the incomplete portion of the IP address from the obtained message does not match the like incomplete portion of the reference IP address; and
   deleting all instances of the requesting user from the list in the memory system if the incomplete portion of the IP address obtained from the received message does not match the like incomplete portion of the reference IP address.

5. The method of claim 4, comprising the further step of initiating a login procedure if the login data of the requesting user is not currently listed in the memory system.

6. The method of claim 4, wherein the incomplete portion of the IP address includes the first characters of the IP address.

7. The method of claim 4, wherein the IP address information is received from a proxy server capable of sending a plurality of IP addresses assigned to a plurality of client devices, and wherein the IP address includes the incomplete portion which is constant for each of the plurality of IP addresses.

8. A program product stored on a non-transitory recordable medium for providing security for an Internet server, the program product comprising:
   a component for processing logical security information received from a client device during a server session in order to authenticate a logged in user;
   a component for processing Internet protocol (IP) address information of the client device in order to authenticate the client device during the server session by comparing the IP address of a received message against the list of IP addresses stored by the server; and
   a component for storing, at the Internet server, a list of each logged in user and a respective reference IP address collected during a login procedure, wherein the component for processing logical security information is configured to access the list to authenticate the logged in user, and wherein the component for processing IP address information is configured to separately access the list to authenticate the client device;
   wherein the component for processing IP address information includes a proxy server module for comparing only an incomplete portion of an IP address obtained from a received message against only a like incomplete portion of the reference IP address for the logged in user;
   wherein the component for processing IP address information further performs the following:
      terminates the session for the user if the incomplete portion of the IP address obtained from the received message does not match the like incomplete portion of the reference IP address for the logged in user stored in the list; and
      deletes all instances of the logged in user from the stored list if the incomplete portion of the IP address obtained from the received message does not match the like incomplete portion of the respective reference IP address for the logged in user.

9. The program product of claim 8, wherein the incomplete portion of the IP address includes the first characters of the IP address.

10. The program product of claim 8, wherein the IP address information is received from a proxy server capable of sending a plurality of IP addresses assigned to a plurality of client devices, and wherein the IP address includes the incomplete portion which is constant for each of the plurality of IP addresses.

* * * * *